May 19, 1936. C. V. DAME ET AL 2,041,654
POWER ATTACHMENT MEANS FOR LAWN MOWERS
Filed Aug. 20, 1934   3 Sheets-Sheet 2

Inventors:
Charles Vance Dame
Boyd Barber
by Maxwell F. Cargill
Attorney.

May 19, 1936.  C. V. DAME ET AL  2,041,654
POWER ATTACHMENT MEANS FOR LAWN MOWERS
Filed Aug. 20, 1934   3 Sheets-Sheet 3
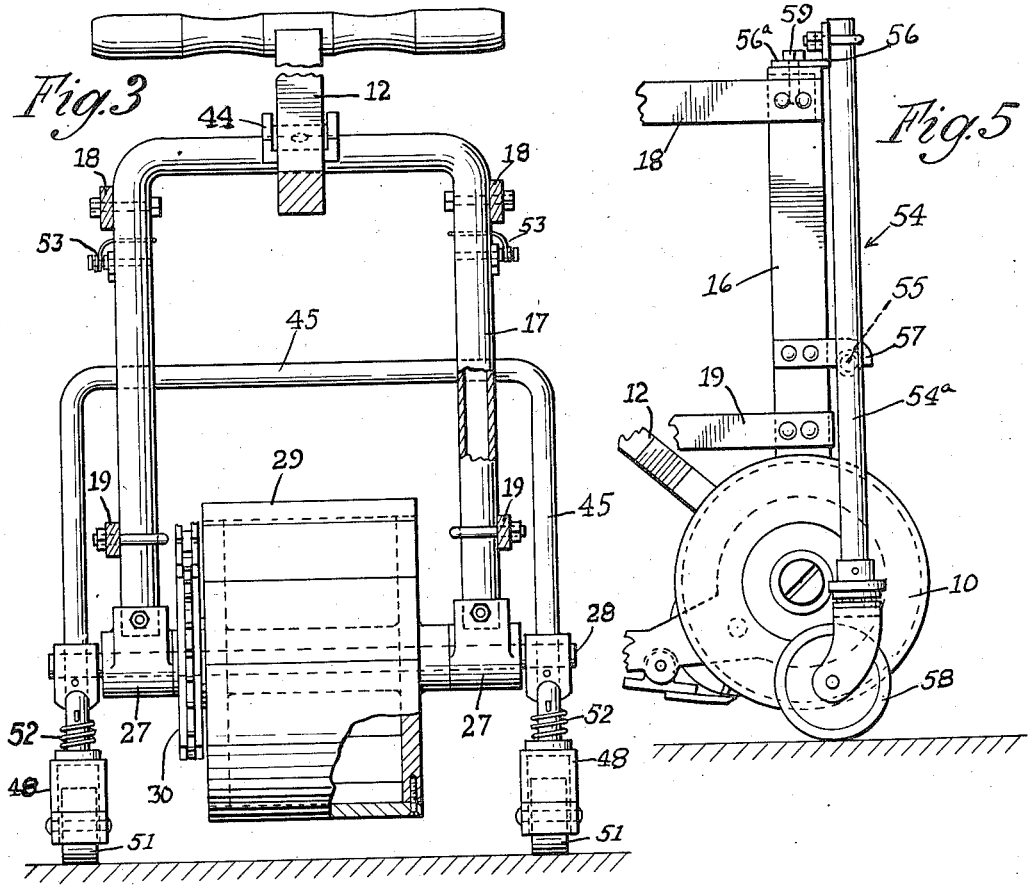
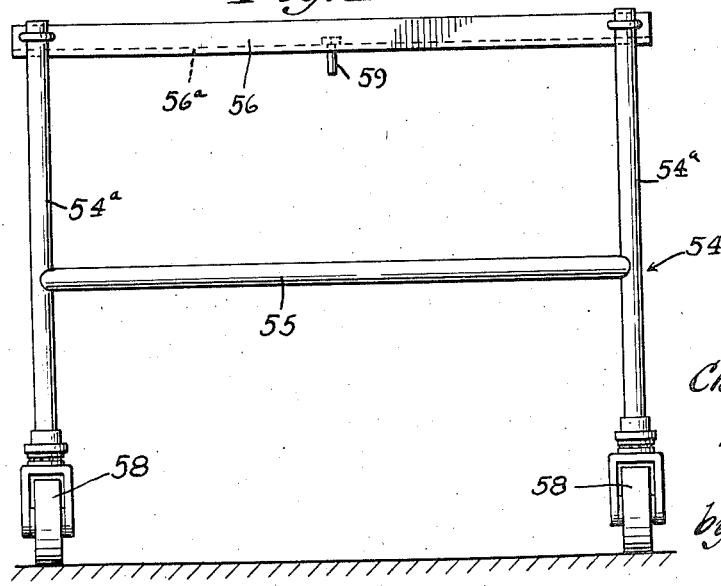
Inventors:
Charles Vance Dame
Boyd Barber
by Maxwell F. Cargill
Attorney.

Patented May 19, 1936

2,041,654

UNITED STATES PATENT OFFICE 2,041,654

POWER ATTACHMENT MEANS FOR LAWN MOWERS

Charles Vance Dame and Boyd Barber, Lanark, Ill.; said Barber assignor to said Dame Application August 20, 1934, Serial No. 740,602

7 Claims. (Cl. 56—26)

This invention relates to power attachments for lawn mowers.

One object of the invention is to provide a power unit which may be attached readily to a conventional lawn mower to convert the same into a self-propelled implement.

Another object of the invention is to provide a power attachment for a conventional lawn mower for propelling the same and whereby the lawn mower constitutes the dirigible unit for the assembly.

A further object of the invention is to provide means whereby the rear end of the machine can be swung around readily in sharply changing its direction of movement whereby the operator can start a cut or swath at right angles or at acute angles to the preceding swath and avoid the necessity of curving corners and returning later to trim the grass which was left uncut in manipulating the machine at the turns.

Another object of the invention is to provide a power driving attachment for lawn mowers having an auxiliary frame provided with road wheels holding the mower off the ground during transportation thereof.

A further object of the invention is to provide an attachment for lawn mowers powered by an internal combustion engine having a stack for conveying hot air and the exhaust gases of the engine to a point away from the operator, the stack preferably comprising a Venturi construction wherein the passage of the exhaust gases therethrough supplements the flow of cooling air to the engine.

Other objects relate to various features of construction and arrangement of parts which will be apparent from a consideration of the following specification and accompanying drawings which illustrate an embodiment of the invention.

In the drawings:

Figure 3 is a sectional view taken on line 3—3 of Figure 2.

Figure 4 is an elevation of a detachable wheeled frame for supporting the forward end of the machine during transportation thereof.

Figure 5 is a broken side elevation showing the auxiliary supporting frame in position.

Figure 1:
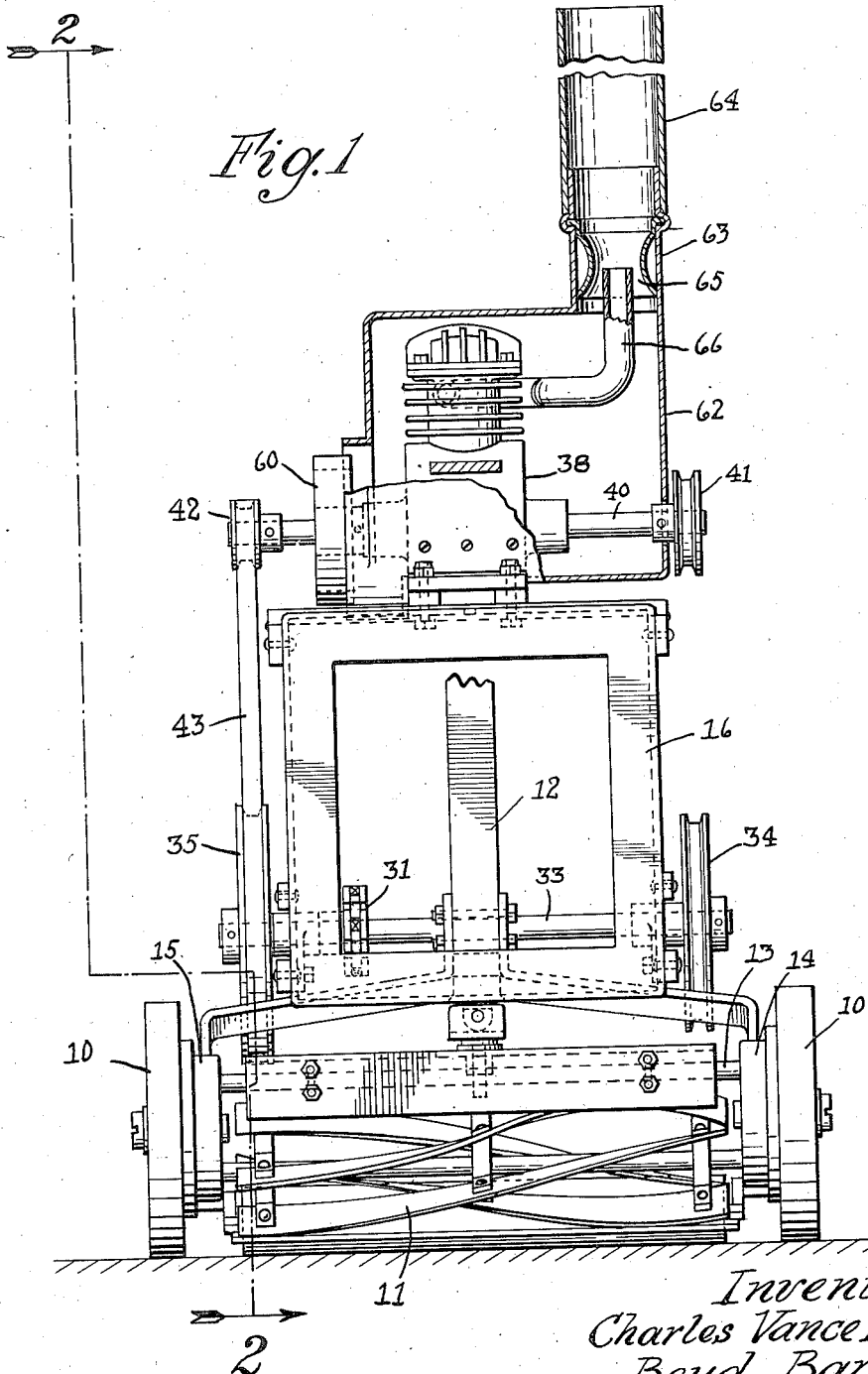
Figure 1 is a front elevation of a conventional lawn mower shown in association with a power attachment embodying the present improvements, the attachment being shown partially in section.

In the drawings a conventional lawn mower is shown having the usual ground wheels 10 which through conventional gear mechanism operate the blades 11. The mower likewise has a conventional handle 12. Lawn mowers generally have a stationary transverse rod 13 extending from one housing 14 to the other housing 15, and we employ this stationary rod as the point for attaching the supporting structure of the power attachment to the mower.

The attachment is shown as comprising a suitable supporting structure which may comprise a front rectangular frame 16 and a rear frame 17 which are connected by pairs of horizontal members 18 and 19. The forward frame 16 is shown as being formed of angle iron and the rear frame 17 as of tubular material although any suitably constructed supporting structure may be employed.

The forward end of the structure is shown pivotally connected to the lawn mower. In the arrangement shown an L-shaped bar 20 is attached to the rod 13 by U-bolts 21, the bar having a horizontal rearwardly extending flange 20a. The bar is centrally apertured and may have welded thereto at the aperture a depending sleeve 22 which forms the bearing for a pivot pin 23 extending from a U-shaped bracket or yoke 24. A horizontal pin 25 is carried by the arms of the yoke 24, and passes through openings in the depending arms of another yoke member 26 which is secured to the base of the frame section 16. This arrangement thus permits the mower to be turned with reference to the frame upon the vertical pivot pin 23, and permits the wheels of the mower to follow the contour of the ground without imparting twisting stresses to the frame by virtue of the horizontal pivot 25.

Figure 2:
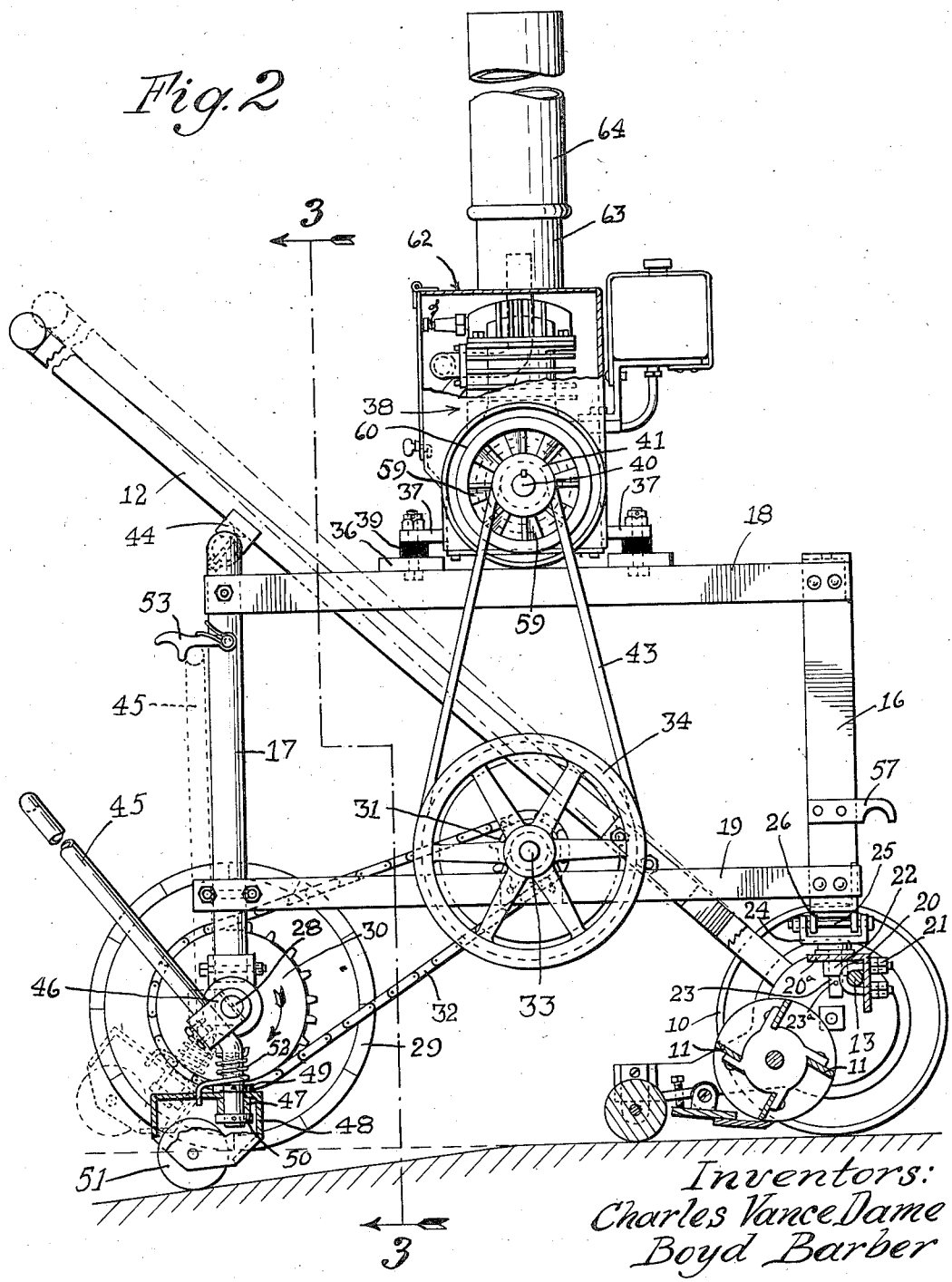
Figure 2 is a side elevation of the machine, partially in section.

At the rear of the structure the frame section 17 is provided with housings 27 in which is secured a shaft 28 having rotatably mounted thereon a relatively wide traction member or drum 29. A sprocket wheel 30 is secured to the drum and over the sprocket and a drive pinion 31 is trained a drive chain 32. The pinion 31 is mounted on a counter shaft 33, suitably carried on the longitudinal members 19, as shown in Figure 2.

As will be noted, the drum or traction member 29 is of less width than the frame 17 and the sprocket 30, chain 32 and the pinion 31 are located within the confines of the supporting structure. The shaft 33, however, extends beyond each end of the structure and has mounted thereon driven pulleys 34 and 35.

On the frame members 18 we have shown transverse supports 36, upon which are mounted engine brackets 37 of the small internal combustion engine indicated generally by the numeral 38. Between the plates 36 and the brackets 37 a cushion material such as rubber 39 may be employed, if desired.

The engine 38 has a shaft 40 extending transversely of the machine and has mounted on the ends drive pulleys 41 and 42. The pulleys 41 and 42, as shown in Figure 1, are of different diameter, as are likewise pulleys 34 and 35. The diameters of the pulleys are so correlated preferably that the drive belt 43 may be removed from the pulleys 42 and 35 and placed on pulleys 41 and 34 for increasing the driving speed of the engine, although the engine, of course, may be regulated in any conventional manner by controlling the fuel admission.

As the engine operates, power is delivered by means of belt 43 to the counter shaft 33, and from the drive pinion 31 and chain 32 to the sprocket 30 which may be attached to the traction member 29 for driving the same.

The operator of the machine walks at the rear thereof and since the handle of the mower 12 extends to the rear of the supporting structure or frame of the attachment, he steers the machine by means of the handle 12. In other words, the lawn mower constitutes the steering unit of the mowing machine.

At the top of the frame section 17 we have shown a U-shaped bracket 44, in which the handle 12 seats for retaining the handle normally in position centrally of the frame. Thus when the machine is traveling in a straight line the bracket 44 will retain the handle in the central longitudinal plane of the machine without the necessity of the operator attempting to hold the handle in such central or fixed position. However, if the machine deviates from the desired line of cut, by lifting the handle slightly out of the bracket, as to the dotted line position shown in Figure 2, the handle may be swung from side to side for steering purposes.

To avoid the use of a clutch and for facilitating turning the apparatus sharply at the end of a cut or swath, we have provided a U-shaped frame 45 or swath, we have provided a U-shaped frame 45 which may be made of tubular material and which is pivotally carried on the ends of the shaft 28. The frame 45 may have attached thereto bearing members 46 mounted on the ends of the shaft. The ends of the arms of member 45 are preferably shaped at an angle as shown in Figure 2, and extend through bearing sleeves 47 carried by the pulley housings 48 and secured therein by upper and lower sleeves 49 and 50.

The caster housings 48 carry caster wheels 51 as shown in Figure 2, and as will be noted inclose the major portions of the wheels to prevent cut grass, thrown rearwardly by the mower, from fouling the wheel. The casters and their housings are free to turn on the lower ends of the arms of the member 45, but preferably helical springs 52 are provided, each having a lower end secured to a wheel housing and the upper end secured to an arm of the member 45 whereby the springs tend to hold the casters in position parallel with the machine.

When the operator wishes to stop the machine without stopping the engine he moves the frame 45 from the dotted line position shown in Figure 2, (in which position it may be releasably held by a spring actuated catch 53) to the full line position which, as will be seen, forces the caster wheels 51 into contact with the ground and elevates the entire rear end of the machine, including the traction drum.

The caster construction described is also useful when the machine is to be turned sharply at the end of a swath since when the machine has been elevated by throwing the frame 45 downwardly to elevate the rear end of the machine, the rear end can readily be swung around to align the machine at the desired angle with the former direction of travel, the machine of course pivoting about its forward end. The elevating frame 45 thus eliminates the use of a clutch by enabling the operator to stop the machine with the engine in operation and permits the machine to be swung around with minimum physical effort in making sharp turns.

When the machine has been aligned for the desired direction of travel, the frame 45 is returned to the dotted line position shown in Figure 2, which movement of the frame lowers the traction wheel into contact with the ground.

The springs 52 are sufficiently resilient to permit movement of the casters in either direction on the vertical axis but serve to return the casters to normal position when free of the ground.

When it is desired to transport the machine a considerable distance and without the mower in operation, a supplementary front elevating frame 54, such as is shown in Figures 4 and 5, may be employed.

The front elevating frame 54 may comprise vertical tubular legs 54a and two transverse members 55 and 56 secured thereto, the latter being shown as formed of angle shaped material.

The frame is somewhat wider horizontally than the lawn mower and has casters 58 carried by the legs 54a laterally of the lawn mower wheels 10 when the elevating frame is in operative position. By tilting the upper end of the frame 54 to the right, as viewed in Figure 5, the casters 58 can be moved past the mower wheels 10 until the cross member 55 is positioned beneath the hooks 57 carried by frame 16, after which the frame is moved counterclockwise as viewed in Figure 5, until the flange 56a of member 56 rests upon the upper member 16a of frame 16. A bolt 59 can then be dropped through aligned openings in the members 56 and 16a for retaining the elevating frame in the position shown in Figure 5. The swinging movement of the frame 54 elevates the lawn mower from the ground and in this position the machine can be transported under its own power without operating the mower, the casters 58 serving as the ground wheels of the machine. With the handle 12 of the machine resting in the bracket 44, the machine can readily be steered from the rear thereof by the handle during such transportation.

The motor 38 which, as stated, may be of conventional construction, is provided with a fly wheel 60 having spokes 61 formed as blades or fans for directing air against the engine for cooling the same. We have shown a casing 62 substantially enclosing the motor but being open adjacent the fly wheel for admitting air to the engine. The casing has an upwardly extending stack section 63 carrying a detached section 64 which preferably extends to such height as to carry hot air from the engine above the operator of the machine. As shown in Figure 1 the stack 63 is offset from the center line of the machine so as not unduly to obstruct the vision of the operator.

The stack 63 preferably has a contraction or venturi 65 adjacent which terminiates the exhaust pipe 66 of the engine. The high velocity of the gases passing the venturi augment the intake of cooling air to and through the frame. The exhaust gases are delivered by the detachable stack section 64 above or away from the operator.

As above mentioned, to attach the conventional lawn mower to the machine it is only necessary that the angular member 20 be bolted to the rod 13. The machine can quickly be detached by lifting the supporting structure sufficiently to release the pin 23 from the sleeve or bearing 22. The pivot pin 23 may, of course, be provided with a cotter pin 23a or the like if desired, to prevent accidental dislodgement. Thus when the major portion of a lawn has been cut, the lawn mower may be readily detached and used as an ordinary lawn mower for trimming at corners or around bushes or other places where a hand operated machine is more convenient.

While we have shown and described one embodiment of our improvements for the purpose of illustration, we do not wish to be restricted specifically thereto except as so limited by the appended claims.

We claim:

1. A power actuated lawn mowing machine comprising a supporting structure, an engine carried thereby, a traction wheel at the rear of said structure driven by said engine, a lawn mower pivotally attached to and supporting the forward end of said frame and constituting a dirigible unit for said machine, and means comprising casters at the rear of said frame arranged to be moved in a direction for elevating said traction wheel from driving contact with the ground whereby the rear end of the structure can be moved on the casters about the point of pivotal connection of the structure with the mower.

2. A power actuated lawn mowing machine comprising a supporting structure, an engine carried thereby, a traction wheel at the rear of said structure driven by said engine, a lawn mower pivotally attached to and supporting the forward end of said frame and constituting a dirigible unit for said machine, and means at the rear of said frame for elevating said traction wheel from driving contact with the ground and enabling the same to be moved manually about the point of pivotal connection thereof with said mower, said means comprising a member horizontally pivoted to said structure and provided with casters at each side of said wheel.

3. A lawn mowing machine comprising a supporting structure, an engine carried thereby, a traction wheel at the rear of said structure and arranged to be driven by said engine, a lawn mower having a horizontal non-rotatable member pivotally attached to and supporting the forward end of said structure, and a handle for said mower secured thereto at points at the rear of said pivotal connection and extending rearwardly beyond said structure whereby said mower constitutes a steering unit for said machine operable by an operator at the rear thereof.

4. A lawn mowing machine comprising a supporting structure having an internal combustion engine positioned thereon, a traction wheel at the rear of said structure arranged to be driven by said engine, a lawn mower pivotally attached to the forward end of said structure and provided with a handle extending rearwardly of said structure whereby said mower constitutes a steering unit for said machine by an operator at the rear thereof, and a pair of casters carried at the rear of said structure normally out of contact with the ground and provided with means for moving the same into contact with the ground to elevate said traction wheel and enable the machine to be swung in either direction about the pivoted forward end thereof.

5. A power attachment for a conventional lawn mower having a conventional rearwardly extending handle comprising a supporting structure, a traction drum journalled therein adjacent the rear thereof, a motor carried by said structure, driving means connecting said motor with said drum, and means at the forward end of said structure comprising a pivotally movable clamp for readily detachably connecting the structure to a transverse non-rotatable portion of a lawn mower, whereby the latter supports the forward end of said structure and in conjunction with the conventional handle constitutes a dirigible unit for the structure.

6. A power driving attachment for a conventional lawn mower having a handle and a relatively stationary transverse member comprising a supporting structure of such length from front to rear that the handle is adapted to project at the rear thereof, a traction drum supporting the rear of said structure, a motor carried by the structure operatively connected to said drum for driving the same, and pivotal clamping means carried by the forward end of said structure for attaching the same to said transverse member of the mower with the handle of the mower projecting through and to the rear of said structure and swingable laterally within the same whereby the mower constitutes a dirigible unit for the mower by an operator at the rear thereof.

7. A power attachment for conventional lawn mowers comprising a supporting structure, pivotal means at the forward end thereof for detachably connecting the same to a transverse portion of a lawn mower, a traction drum at the rear of said structure, a motor carried by said structure for driving said drum, and an elevating device pivoted coaxially with said drum and provided with a pair of casters arranged to be swung into contact with the ground for elevating said drum whereby the rear end of the structure can be swung on said casters about the pivoted forward end thereof.

CHARLES VANCE DAME.
BOYD BARBER.